A. B. SMITH.
GEARING.
No. 179,737. Patented July 11, 1876.
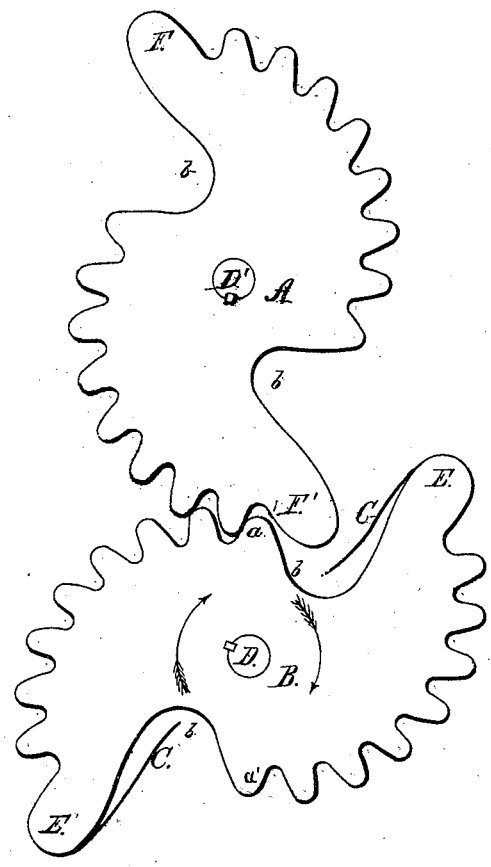
Attest:
A. M. Smith
M. Gardner
Inventor:
Anselm B. Smith

UNITED STATES PATENT OFFICE.

ANSELMO B. SMITH, OF DENVER, COLORADO TERRITORY.

IMPROVEMENT IN GEARING.

Specification forming part of Letters Patent No. 179,737, dated July 11, 1876; application filed June 24, 1876.

*To all whom it may concern:*

Be it known that I, ANSELMO B. SMITH, of Denver, Colorado Territory, have invented a new and useful Improvement in Irregular or Cammed Geared Wheels, which improvement is fully set forth in the following specification, reference being had to the accompanying drawings:

The object of my invention is to convert a regular rotary motion into an irregular rotary motion by the means of what may be termed double-cammed gears A and B, secured on shafts D' D, B being the driving-shaft and regular motion, and A being the driven shaft and irregular motion, which is produced by the increasing diameter of the driver B, and the decreasing diameter of the driven, A, making an increased motion of A from slow to fast, while the driver B turns half-way over, and then at once drops from fast motion to a momentary pause, and then repeats the same motion again from slow to fast, and so keeps repeating. When the cog $a$ comes in contact with the long cammed-shaped cog F', the motion of A is very slow, and, as B revolves, increasing the motion of A until the long cammed-shaped cog E' reaches the deep depression $b'$, when there is an extra increase in the motion of A, consequent by the nearer approach of E' to the center of A, until E' shall have arrived to about in a line with shafts D D', at which time the momentary pause occurs, and then the same motion commences again. The extra-increased motion referred to is doubly necessary—first, to get the long cammed cog F sufficiently advanced to drop into the depression $b'$ before the cog $a$ intervenes; second, to increase the motion of A to a greater extent, which will more fully appear when the present use is set forth.

The springs C C may be made as shown in the drawings, or of rubber inserted in a cavity in the edge of the wheel, and are used to prevent any backlash in the cogs while changing from a fast to a slow motion, and making $a$ enter its proper place, instead of, perhaps, striking against the cog beyond. The same result of motion may be obtained by using a pair of single-cammed cog-wheels having the cammed-shaped cog and depression, thereby causing the driving-shaft to make a complete revolution before the motion commences to repeat again from slow to fast.

The ratio of increased motion or (by a slight change in the construction of the long-cammed cog and the depression) decreased motion, by reversing the motion of the driver, may be more or less, to suit the purpose to which it is applied, by varying the center of the irregular wheels—in other words, by decreasing or increasing the distance from $a$ to D, and increasing or decreasing the distance from E' to D, thereby increasing or decreasing the ratio, as desired.

The object to which I apply the motion at present is to reciprocate the tables used in stamp-mills for reducing and concentrating ores, which tables of themselves are quite heavy, and, when loaded with pulverized quartz, are still more so, and have to be run at a given speed to produce the desired effect on the pulverized quartz, as the tables strike a solid resistance at each end of the stroke, and hence, when started in an opposite direction, it must be done by commencing to move slowly, so as to not create any undue strain or jar on the machinery, and more especially so as not to slide the pulverized quartz on the table, and at the completion of the stroke it must be quick to give the shock. I get the above-required motion by having a crank attached to the shaft D', and, by a pitman, transmit the motion to the table. Right here comes in the point referred to heretofore about extra-increased motion. As the crank nears its so-called dead-centers, there is little or no lateral motion—hence the second reason heretofore named.

I am aware that there are many irregular motions by cammed gears and eccentric gears, which run from slow to fast, and then back again in a reverse motion, but know of no one that runs from slow to fast, and almost instantly drops to slow motion, and then repeats again in a rotary motion.

I claim as my invention—

The two peculiarly double or single cams, cogged, depressed, and otherwise formed as shown and described, the depressions being furnished with springs to prevent backlash, the whole as substantially described.

ANSELMO B. SMITH.

Witnesses:
A. M. SMITH,
JOSEPH E. WALKER.